(12) United States Patent
Hillard et al.

(10) Patent No.: US 12,471,847 B1
(45) Date of Patent: Nov. 18, 2025

(54) DETAINEE MONITORING SYSTEM AND METHOD OF USE

(71) Applicants: Larry Hillard, Waxahachie, TX (US); Tiwangi Hillard, Waxahachie, TX (US)

(72) Inventors: Larry Hillard, Waxahachie, TX (US); Tiwangi Hillard, Waxahachie, TX (US)

( * ) Notice: Subject to any disclaimer, the term of this patent is extended or adjusted under 35 U.S.C. 154(b) by 0 days.

(21) Appl. No.: 17/701,361

(22) Filed: Mar. 22, 2022

(51) Int. Cl.
*A61B 5/00* (2006.01)
*G08C 17/02* (2006.01)

(52) U.S. Cl.
CPC ............ *A61B 5/6824* (2013.01); *G08C 17/02* (2013.01); *A61B 2503/12* (2013.01)

(58) Field of Classification Search
CPC ..... A61B 5/6824; A61B 2503/12; A61B 5/68; A61B 5/6801; A61B 5/6802; A61B 5/702; G08C 17/02; G08C 17/00; E05B 75/00; A61F 5/37; A61F 5/3723; A61F 5/373; A61F 5/3715; A61F 2013/49092
See application file for complete search history.

(56) References Cited

U.S. PATENT DOCUMENTS

| 11,434,668 | B1 * | 9/2022 | Wriggle | G01S 19/14 |
| 11,931,129 | B2 * | 3/2024 | Lee | A61B 5/6824 |
| 2014/0355167 | A1 * | 12/2014 | Reese | A61B 5/28 |
| | | | | 361/232 |
| 2022/0207635 | A1 * | 6/2022 | Hughes | E05B 45/00 |

FOREIGN PATENT DOCUMENTS

| AU | 2022366694 | A1 * | 5/2024 |
| CA | 3232541 | A1 * | 4/2023 |
| CN | 105629839 | A * | 6/2016 |
| KR | 101686883 | B1 * | 3/2015 |
| KR | 101938989 | B1 * | 9/2017 |
| WO | WO-2024107854 | A1 * | 5/2024 |

\* cited by examiner

*Primary Examiner* — Tarla R Patel
(74) *Attorney, Agent, or Firm* — Richard Eldredge; Leavitt Eldredge Law Firm

(57) ABSTRACT

A detainee monitoring system places sensors such as a pulse-oximeter next to a person in handcuffs to measure and report on their vitals like their pulse and blood oxygen level to ensure that while in the cuffs that their wellbeing is not endangered. The sensors could display the measurements on the cuffs or remotely.

4 Claims, 4 Drawing Sheets

DETAINEE MONITORING SYSTEM AND METHOD OF USE

BACKGROUND

1. Field of the Invention

The present invention relates generally to security systems and methods, and more specifically, to a detainee monitoring system that places sensors in position to monitor the pulse, blood-oxygen levels, and other health metrics of a person who is placed in handcuffs or other restraints.

2. Description of Related Art

Security systems are well known in the art and are effective means to ensure the safety of people and property. Common security systems include the use of enforcement officers to detain people that are found where they should not be or who are suspected to be in violation of laws, ordinances, or other behavior statutes. Commonly, when a person is detained they have their hands or feet placed in handcuffs or another type of restraint so that they cannot move or threaten others near them.

Handcuffs are restraint devices designed to secure an individual's wrists in proximity to each other. They are made of two parts, that are linked together by a chain, hinge, or rigid bar. Each cuff has a rotating arm that engages itself with a ratchet that prevents it from being opened once closed around a person's wrist. Without the key, the handcuffs cannot be removed without specialist knowledge, and the handcuffed person cannot move their wrists more than a few centimeters or inches apart, making many tasks difficult or impossible.

Legcuffs are similar to handcuffs but have a larger inner diameter so that they fit around a person's ankles. Some models consist of elliptically contoured cuffs so that they widely adapt to the natural shape of the ankle. This minimizes pressure on the Achilles' tendon. Standard-type leg irons have a longer chain connecting the two cuffs compared to handcuffs.

One of the problems associated with common security systems and handcuffs is their limited efficiency. For example, when a person is restrained their body is placed under stress. This stress in combination with other factors that may be unknown to those who placed the handcuffs on the person, combine to place the restrained person in danger. When the person is retrained, the restraining party must constantly check the status of the restrained person. This constant checking detracts from other tasks.

Accordingly, although great strides have been made in the area of security systems and handcuffs, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
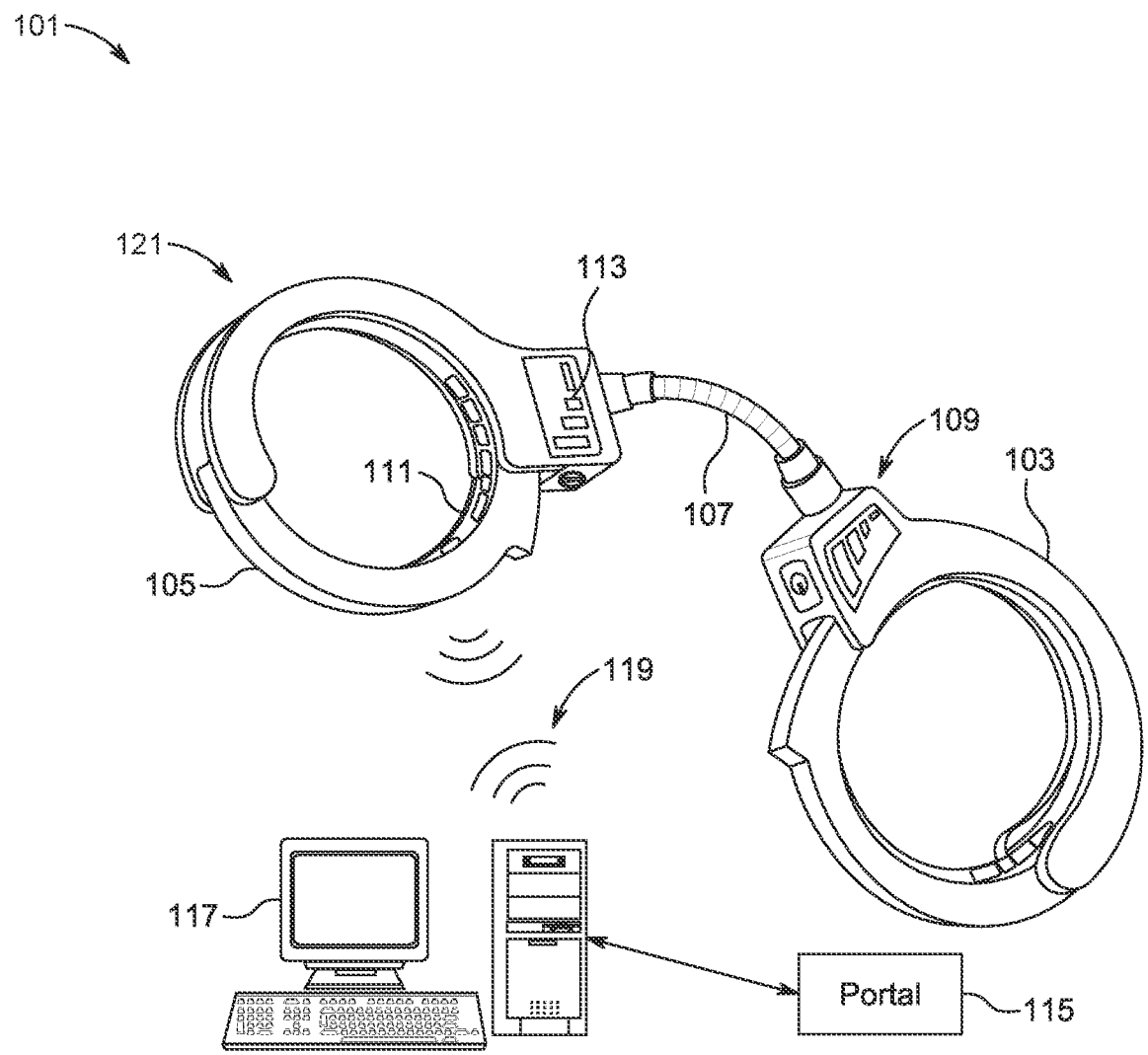
FIG. 1 is a front view of a detainee monitoring system in accordance with a preferred embodiment of the present application.
Figure 2:
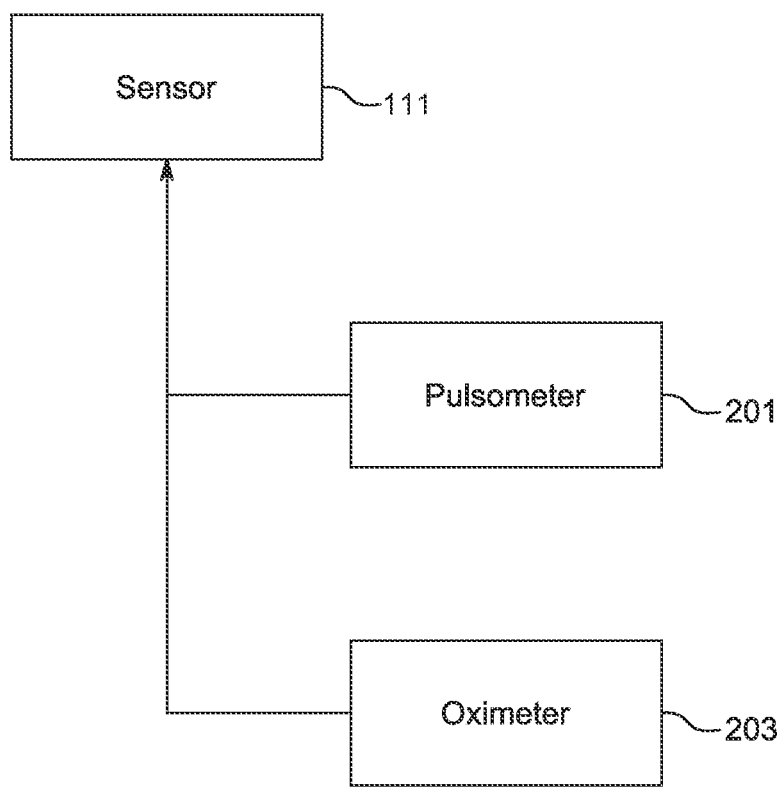
FIG. 2 is a simplified schematic of the sensors of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional security systems and handcuffs. Specifically, the present invention captures and displays the status of a person who is in handcuffs or other restraints to ensure that they are in a stable health position. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front view of a detainee monitoring system in accordance with a preferred embodiment of the present application. It will be appreciated that system 101 overcomes one or more of the above-listed problems commonly associated with conventional security systems and handcuffs.

In the contemplated embodiment, system 101 includes a pair of handcuffs 121 that has a first cuff 103 flexibly attached to a second cuff 105 via a chain 107. Both first cuff 103 and second cuff 105 have a display 109 that projects data from sensors 111 that are attached to the cuffs. Display 109 contains individual outputs 113. Sensors 111 are configured to obtain data from a person to whom the respective cuff is attached. The sensors are in electronic communication with display 109 and with a portal 115 that operates on a computing device 117 via a network 119.

In use, first cuff 103 is attached to a wrist of a detainee, second cuff 105 is attached to another wrist of the detainee or to another object so that the movement of the detainee is reduced. Sensors 111 in first cuff 103 and in second cuff 105 measure some aspect of the detainee and transmit the data from the measurements to display 109 and portal 115 where there are monitored. Display 109 shows the collected data in individual outputs 113 so that they are visible and clear to read. Portal 115 displays the data received from sensors 111 so that others may monitor the data from sensors 111. If the detainee shows signs of distress the detainer adjusts their position or first cuff 103 or second cuff 105.

It should be appreciated that one of the unique features believed characteristic of the present application is that sensors measure the health status of a detainee to ensure that while restrained they remain in good health.

Figure 3:
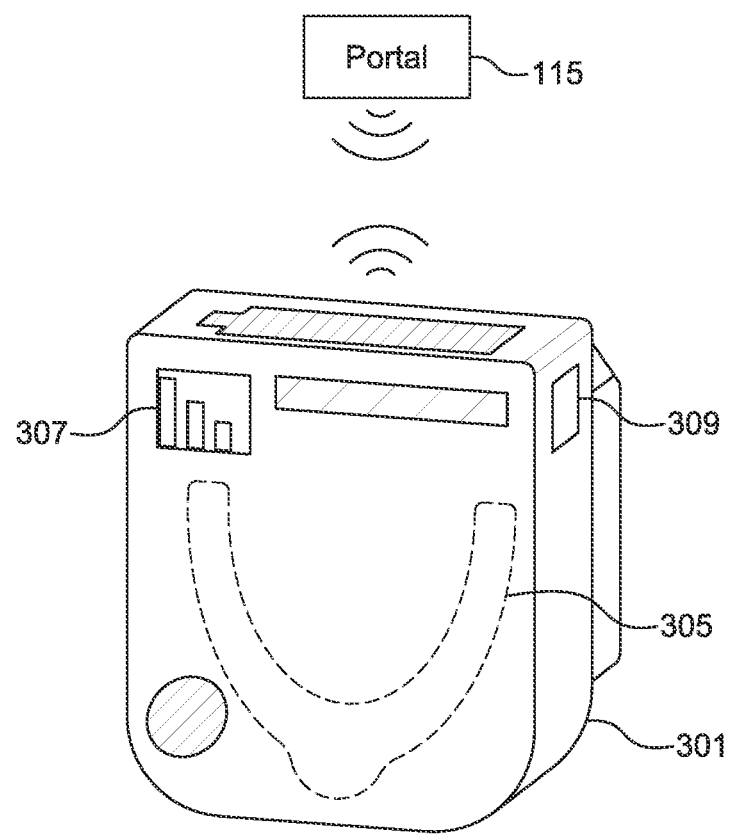
FIG. 3 is a front view of an alternative embodiment of the display of FIG. 1.

Referring now to FIG. 3, sensors 111 are further depicted. It is contemplated that sensors 111 could be of any configuration to take any measurement from the detainee. For example, sensor 111 could be a pulsometer 201 and an oximeter 203. Pulsometer 201 and oximeter 203 detect the flow of blood through light-emitting diodes (LEDs) which shine two types of red light through the tissue. A receptor on the other side of the tissue picks up the light that is transferred through the tissues to determine which of the hemoglobin is in pulsatile blood (arterial) and the SpO2 of arterial blood in the peripheral circulation. This example is provided to illustrate possible sensors and not to limit the scope of the disclosure. For example, sensor 111 could be a GPS transmitter that determines the location of handcuffs 121 that could be sent to display 109, portal 115 or the like. Other data could be obtained from a GPS transmitter that includes all aspects of global positioning such as speed, altitude, temperature, and the like.

It is contemplated and is depicted in FIG. 3 that the system 101 could be stowable in a carrier 301 that is in electronic communication with portal 115. Carrier 301 holds a set of cuffs 305. Carrier 301 includes a display 307 on the outside thereof and is in electronic communication with the sensors of cuffs 305. A power source 309 is attached to carrier 301 and provides electrical power thereto as to cuffs 305. In this embodiment, a person monitors the status of a detainee even when they are not in the line of sight with display 109 but are of display 307 of carrier 301.

Figure 4:
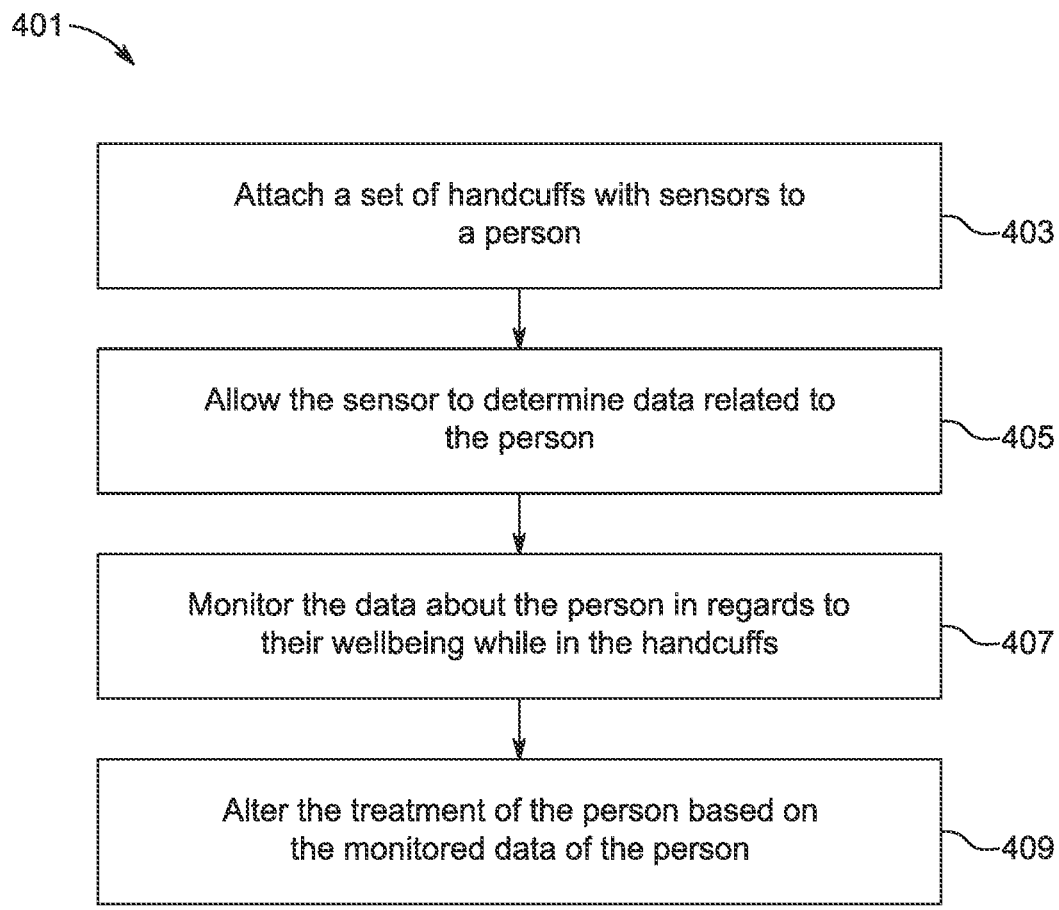
FIG. 4 is a flowchart of a method of monitoring the vital health indicators of a person in restraints.

Referring now to FIG. 4 a method of monitoring the vital health indicators of a person in restraints is depicted. Method 401 includes attaching a set of handcuffs with sensors to a person 403, allowing the sensor to determine data related to the person 405, monitoring the data about the person in regards to their wellbeing while in the handcuffs 407, and altering the treatment of the person based on the monitored data of the person 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A detainee monitoring system comprising:
    a first cuff attached to a second cuff;
    each cuff having;
        an outer surface;
        a sensor configured to sense health information from a detainee;
        a display in data communication with the sensor, the sensor is configured to display health information from the detainee;
        a transmitter in data communication with the sensor; and
        a battery to power the sensor, the display, and the transmitter;
    a portal in wireless communication with the transmitter, the portal has a computer displays that shows health information from the detainee at a remote location relative to the sensor; and
    a stowable carrier, having:
        a body forming a cavity and an opening configured to receive the first and second handcuff;
        a display positioned on an exterior surface and in communication with the sensor; and
        a power source configured to charge the battery.

2. The system of claim 1 wherein the sensor measures a pulse and oxygen saturation of the attached to at least the first cuff or second cuff.

3. The system of claim 1 further comprising:
    a second sensor secured to the first cuff and configured determines a position of the first cuff or second cuff.

4. A method of monitoring the vital health indicators of a person in restraints, comprising:
    providing the system of claim 1;
    attaching the first cuff and the second cuff to the detainee;
    allowing the sensor to determine data related to the detainee;
    alerting a treatment of the detainee based on the monitored data of the detainee;
    storing the first cuff and the second cuff within the stowable carrier; and
    charging the battery with the power source.

* * * * *